United States Patent
Delmerico et al.

(10) Patent No.: US 7,679,215 B2
(45) Date of Patent: Mar. 16, 2010

(54) WIND FARM POWER RAMP RATE CONTROL SYSTEM AND METHOD

(75) Inventors: Robert William Delmerico, Clifton Park, NY (US); Mark Edward Cardinal, Altamont, NY (US); Kirk Gee Pierce, Simpsonville, SC (US)

(73) Assignee: General Electric Company, Niskayuna, NY (US)

( * ) Notice: Subject to any disclaimer, the term of this patent is extended or adjusted under 35 U.S.C. 154(b) by 1014 days.

(21) Appl. No.: 11/015,515

(22) Filed: Dec. 17, 2004

(65) Prior Publication Data

US 2006/0132993 A1    Jun. 22, 2006

(51) Int. Cl.
H02J 1/10    (2006.01)
(52) U.S. Cl. ............... 307/57; 290/55; 307/84
(58) Field of Classification Search .......... 307/57, 307/62, 84, 86, 153, 72, 76; 361/20, 21; 700/287, 290; 290/44, 55; 322/35
See application file for complete search history.

(56) References Cited

U.S. PATENT DOCUMENTS

| | | | |
|---|---|---|---|
| 4,161,658 A * | 7/1979 | Patrick | 290/44 |
| 4,703,189 A * | 10/1987 | DiValentin et al. | 290/44 |
| 6,745,109 B2 * | 6/2004 | Kojima et al. | 700/291 |
| 6,917,123 B2 * | 7/2005 | Rowe | 307/43 |
| 7,119,452 B2 * | 10/2006 | Larsen | 290/55 |
| 7,298,059 B2 * | 11/2007 | Delmerico et al. | 307/85 |
| 2004/0207207 A1 | 10/2004 | Stahlkopf | 290/44 |
| 2005/0042098 A1 * | 2/2005 | Wobben | 416/132 B |

OTHER PUBLICATIONS

"Wind Turbines Connected to Grids with Voltages above 100KV", Technical Regulation, [Online] No. TF3.2.5, Dec. 3, 2004, XP002542209 Danmark.
Clemens Jauch, Pout. Sorenson, Birgitte, Bak-Jensen: "International Review of Grid Connection Requirements for Wind Turbines", Nordic Wind Power Conference, [Online], Mar. 2, 2004, XP002542210.
Edward J. Simbuger, C. Keith Cretcher:"Load Following Impacts of a Large Wind Farm on an Interconnected Electric Utility System", IEEE Transactions on Power Apparatus and Systems, vol. PAS-102, No. 3, Mar. 1983, pp. 687.692, XP002542211, ISSN:0018-9510.
Karsten Burges, Alex M. De Broe, Andrés Feijóo: "Advanced Power Control in a Wind Farm Network", Power Tech Conference Proceedings, vol. 3, Jun. 14, 2004, - Jun. 26, 2004 XP002542212, Bologna, ISBN: 0/7803-7967-5 chapter: "VI. Active Power Control", chapter: "VIII. Implementation Aspects".
The extended European Search Report for EP 05257692.3, Sep. 16, 2009 (Sep. 16, 2009).

* cited by examiner

*Primary Examiner*—Albert W Paladini
*Assistant Examiner*—Carlos Amaya
(74) *Attorney, Agent, or Firm*—Fletcher Yoder (57) ABSTRACT

A system and method for controlling power ramp rate of a wind farm is provided. The wind farm includes a plurality of wind turbine generators and a wind farm control system. The wind farm control system is operable to monitor rate of change of collective power output of the wind turbine generators, and to limit the rate of change of collective power output by generating a power output rate limiting signal based on the monitored rate of change of collective power output of the wind turbine generators and a desired collective power ramp of the wind turbine generators and applying the power output rate limiting signal to the plurality of wind turbine generators.

17 Claims, 5 Drawing Sheets

WIND FARM POWER RAMP RATE CONTROL SYSTEM AND METHOD

BACKGROUND

The invention relates generally to wind power generation, and more particularly to techniques for controlling power ramp rates of a wind farm having multiple wind turbine generators.

A wind power generation system generally includes a wind farm having a plurality of wind turbine generators supplying power to a utility grid. Collective power output of the wind farm is greatly influenced by wind conditions on individual wind turbine generators. Utilities often have other power resources, such as thermal power plants to balance their electrical loads, thus accommodating variability in wind conditions during intermittent wind conditions. Thermal power plants may include, for example, coal and gas fired stations. Power fluctuation of wind farms due to gusty or low wind conditions is usually dealt with by adjusting power output of these thermal power plants to provide relatively constant overall power matching demands.

However, it is often difficult to change power output of thermal power plants instantaneously. Changing of power output may be also referred to as ramping. Thermal power generators desirably require a ramp rate that does not impose excessive thermal stresses, and that accommodate the natural lag times involved in heating and cooling the heat transfer components. As an example, coal-fired power stations may take over 12 hours to start from cold, and, even when hot, may take 2 to 3 hours to be ramped from 0-100% of their rated power. Ramping down of such thermal power generators may require even slower rates to minimize risk of damaging plant components. Wind conditions, on the other hand, may change drastically in a relatively shorter time span. It is, therefore, desirable to control power ramp rates of wind farms taking into consideration the maximum prescribed power ramp rates of such other power resources.

It is possible to limit power ramp rates of individual wind turbine generators at any level up to a maximum power value that is dependent on the current wind speed. This is achieved by curtailing a portion of the power output, so that the power ramp rate does not exceed a maximum desired ramp rate. However this limits the capture of wind energy and increases the effective cost of energy of the wind farm. Further, although power ramp rate control has been achieved to some degree by such techniques on individual generators, the problem has not been addressed at a wind farm level.

There is, hence, a need for a technique to control power ramp rates at a wind farm level within limits prescribed by transmission system operators, while allowing maximum capture of wind energy by individual wind turbine generators.

BRIEF DESCRIPTION

The present technique accordingly provides a novel approach to address the aforementioned problems. In one aspect, a method is provided for regulating rate of change of collective power output of a plurality of wind turbine generators. The method includes monitoring rate of change of collective power output of the wind turbine generators and limiting the rate of change of the collective power output by generating a power output rate limiting signal. The rate limiting signal is based on the monitored rate of change of collective power output of the wind turbine generators and a desired collective power ramp of the wind turbine generators. The power output rate limiting signal is then applied to the plurality of wind turbine generators.

In another aspect, a wind farm is provided. The wind farm includes a plurality of wind turbine generators and a wind farm control system. The wind turbine generators are operable to collectively supply electrical power to a utility system. The wind farm control system is operable to generate a power output rate limiting signal based on monitored collective power ramp rate of the wind turbine generators and a desired ramp rate of the wind farm. The control system then transmits the power output rate limiting signal to the wind turbine generators to control rate of change of one or more operating parameters of individual wind turbine generators.

In yet another aspect, a wind farm control system is provided. The wind farm control system includes a central controller. The controller is operable to monitor rate of change of collective power output of a plurality of wind turbine generators. The controller also limits the rate of change of the collective power output of the wind turbine generators by generating a power output rate limiting signal based on the monitored rate of change of collective power output of the wind turbine generators and a desired collective power ramp of the wind turbine generators. The controller communicates the power output rate limiting signal to the plurality of wind turbine generators.

In still further aspects, computer programs and routines are provided comprising code adapted to implement the above described functionality.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The present technique provides a system and method for controlling power ramp rate of a wind farm having a plurality of wind turbine generators via a central or supervisory wind farm control system. In accordance with aspects of the present techniques, the wind farm control system is operable to control the ramp rate of the wind farm within a maximum ramp rate set by transmission system operators. This rate generally applies to the average power ramp rate of the wind farm over a time window of fixed duration, for example, 1 minute. In certain embodiments, a second (typically lower) ramp rate restriction may apply to the average power ramp rate of the wind farm over a second time window of relatively longer duration, for example 10-15 minutes. These ramp rates may be applicable for various ranges of operation including start up, normal operation and shut down. Control of power ramp rate is achieved by a ramp rate limiting signal communicated by the wind farm control system to individual wind turbine generators. In one embodiment, the ramp rate limiting signal includes a ramp rate command. In a different embodiment, the ramp rate limiting signal may include a power set point command or a torque set point command. Embodiments of the present techniques are described in detail below referring generally to FIGS. 1-6.

Figure 1:
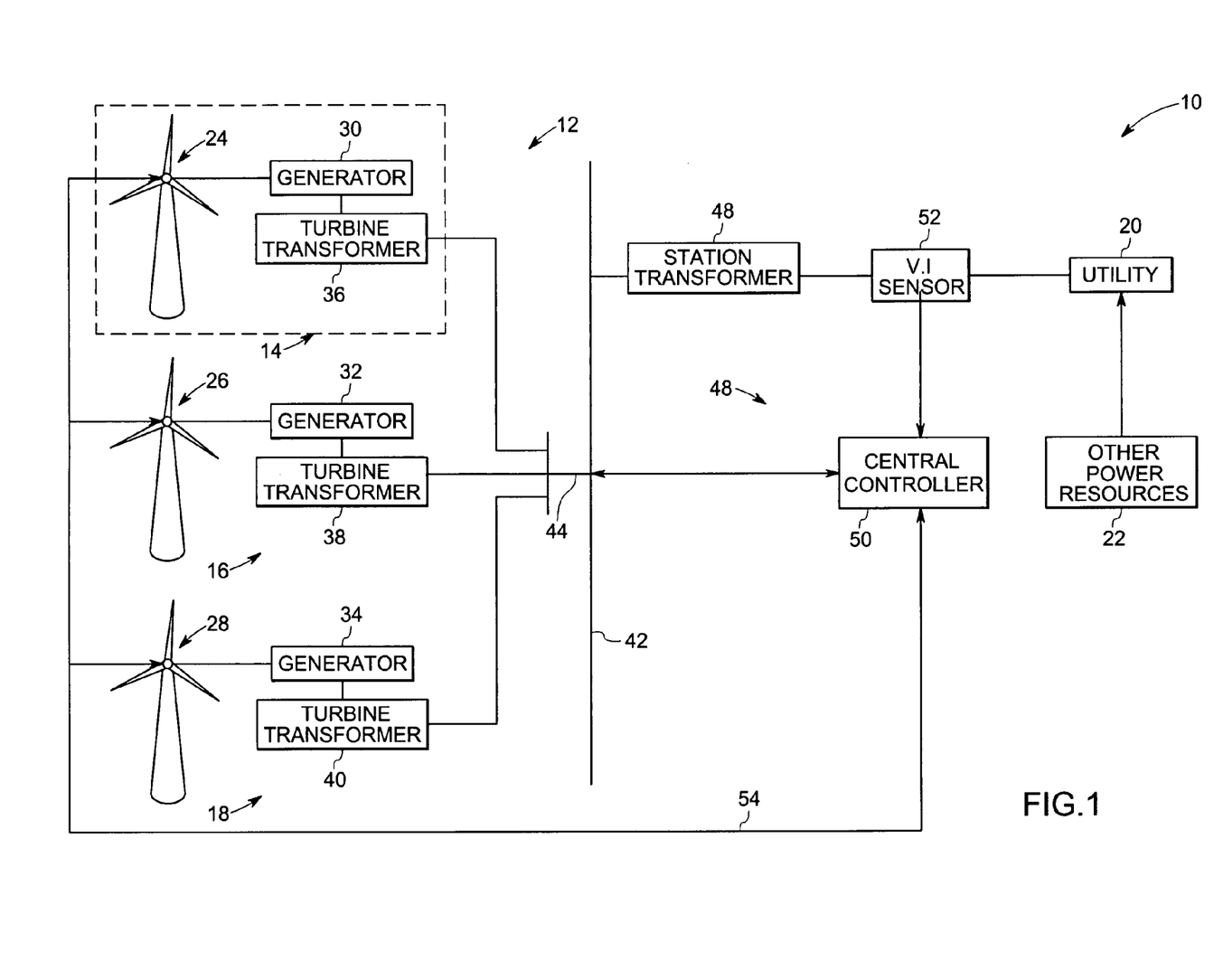
FIG. 1 is a schematic illustration of a wind power generation system according to aspects of the present technique.

FIG. 1 illustrates an exemplary wind power generation system 10 in accordance with aspects of the present technique. The wind power generation system 10 includes a wind farm 12 having a plurality of wind turbine generators 14, 16, 18 operable to supply electrical power to a utility 20. Additionally, the utility 20 may receive power from other power resources 22 to accommodate variability in power output of the wind farm 12 due to intermittent wind conditions. Other power resources 22 may include, for example, thermal, hydroelectric or nuclear power stations, among others.

Wind turbine generators 14, 16, 18 include turbine rotors 24, 26, 28 having one or more blades which drive rotors of electrical generators 30, 32, 34 to produce electrical power. Power produced by generators 30, 32, 34 may be stepped up in voltage by turbine transformers 36, 38, 40 before being coupled to a medium voltage distribution network 42. In the illustrated embodiment, a feeder 44 is used to couple power outputs of wind turbine generators 14, 16, 18 for supply to the medium voltage distribution network 42. In a typical application, the medium voltage distribution network 42 couples power from multiple feeders (not shown), each feeder coupling power outputs of a plurality of wind turbine generators. A station transformer 46 is generally used to step up voltage of the power from the medium voltage distribution network 42 to a transmission voltage required by the utility 22.

In the illustrated embodiment, the wind farm 12 includes a wind farm control system 48 comprising a central controller 50. In the illustrated embodiment, the wind farm control system 48 is operable to monitor and control rate of change of collective power output of the wind farm 12. Rate of change of power output is also referred to in this discussion as "power ramp rate." The wind farm control system 48 further comprises power sensors, such as voltage and current sensors 52, which are configured to sense collective power output of the wind farm 12 and may either be coupled to an output of the station transformer 46 (as illustrated in FIG. 1) or to a point in the medium voltage distribution network 42.

The central controller 50 is configured to communicate with individual wind turbine generators via communication links 54, which may be implemented in hardware and/or software. In certain embodiments, the communication links 54 may be configured to remotely communicate data signals to and from the central controller 50 in accordance with any wired or wireless communication protocol known to one skilled in the art. Such data signals may comprise, for example, signals indicative of operating conditions of individual wind turbine generators transmitted to the central controller 50 and various command signals communicated by the central controller 50 to individual wind turbine generators. The central controller 50 may further be in communication with the medium voltage distribution network 42, and may be operable to control various switching devices in the network 42, such as capacitors and reactors (not shown) so as to control the power output of the wind farm 12 within specifications prescribed by the transmission system operators.

In accordance with the present techniques, control of power ramp rate of the wind farm 12 is split into a power ramp rate limit control at the turbine level and a supervisory control at a wind farm level. Control of power ramp rate limit at the turbine level is discussed generally referring to FIGS. 2 and 3.

Figure 2:
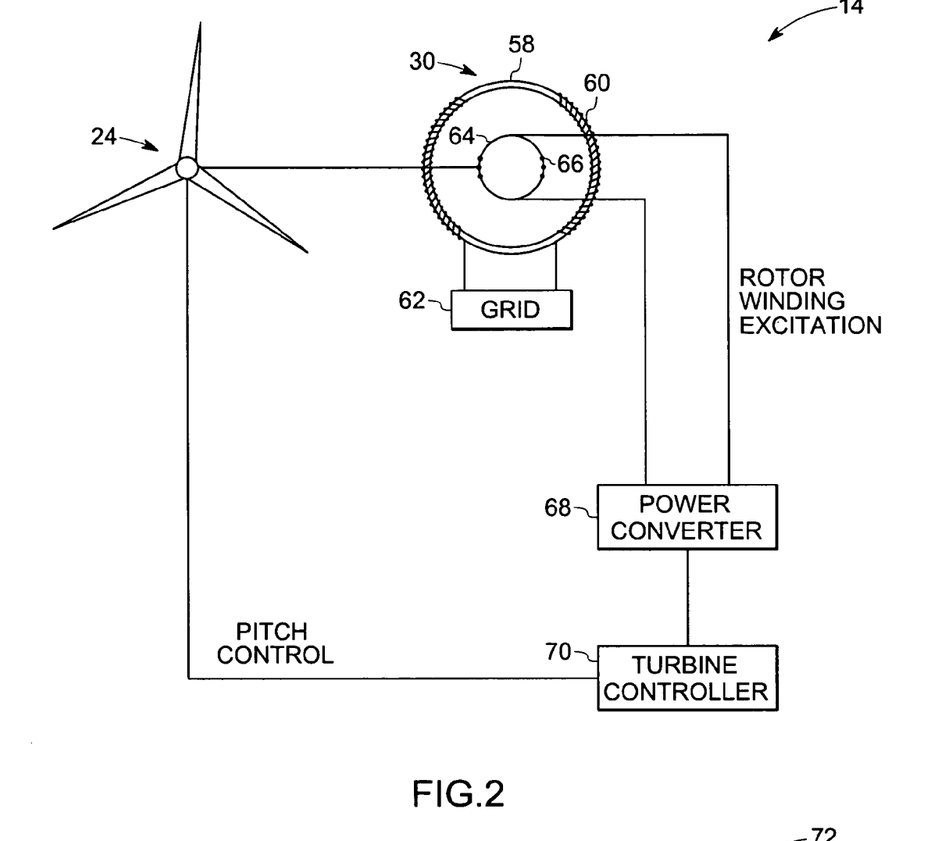
FIG. 2 is a schematic illustration of a wind turbine generator wherein aspects of the present technique are applicable.

FIG. 2 illustrates the functional components of an exemplary wind turbine generator 14 wherein aspects of the present technique are applicable. As discussed above, the wind turbine generator 14 comprises a turbine rotor 24 having one or more blades which drives the electrical generator 30. The generator 30 comprises a stator 58 having windings 60 coupled to grid 62 and a rotor 64 having windings 66 coupled to a power converter 68, such as a variable frequency inverter. The power converter 68 is operable to provide excitation to the rotor windings 66. The power converter 68 is configured to control air gap torque produced by the generator (also called generator torque) by adjusting the excitation to the rotor windings 66. The excitation provided by the power converter 68 is based on a torque command signal transmitted by a turbine controller 70. In one embodiment, the turbine controller 70 may include a programmable logic controller (PLC) operable to implement a torque control algorithm configured to determine the torque command of the generator 30. Torque command to the generator is generally a function of wind speed, and is adapted to optimize turbine performance at a given wind speed. As known to one skilled in the art, power output of the generator is the product of generator speed and generator torque. Accordingly, if speed is known the torque can be adjusted to maintain the desired power ramp rate. The turbine controller 70 may also be operable to control generator speed via regulation of pitch of the turbine blades (i.e. angle of attack by wind on the blades). This is achieved via pitch control mechanisms, which may be implemented in hardware and/or software by the turbine controller 70.

Figure 3:
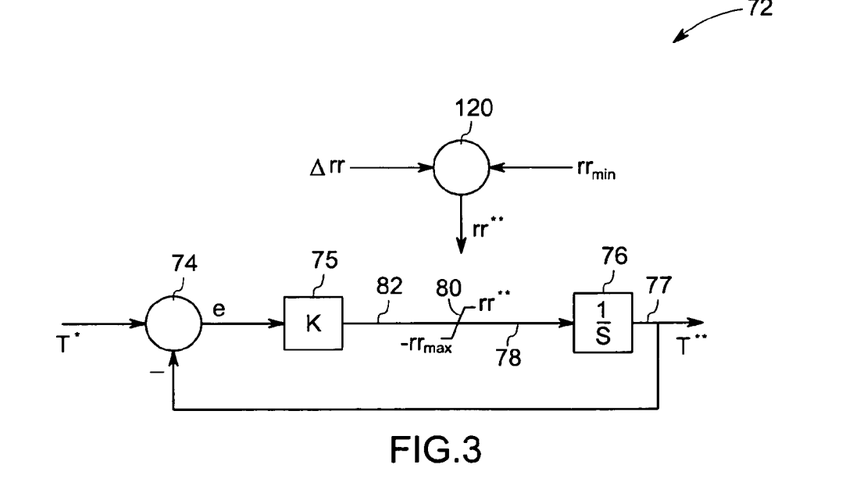
FIG. 3 is a schematic illustration of a turbine level ramp rate control mechanism in accordance with the present technique.

FIG. 3 illustrates a turbine level ramp rate control mechanism 72 in accordance with the present techniques. Turbine level control of power ramp rate may be implemented in hardware and/or software via turbine controllers of individual wind turbine generators. In the illustrated embodiment, the functional blocks of the turbine level control mechanism 72 are implemented after a torque command signal (T*) is generated by the turbine controller and before an actual torque command signal (T**) is received by the power converter. As discussed below, the turbine level control mechanism 72 is operable to limit the rate of change of the torque command signal, thereby controlling rate of change of generator torque.

The turbine level ramp rate control mechanism 72 operates by limiting the rate of change of an actual torque command signal (T**) received by the power converter, and employing a closed-loop feedback control system, such as an integral control system, to minimize an error (e) between the generated torque command signal (T*) and the actual torque command signal (T) received by the power converter. As illustrated, the error (e) is obtained at a difference junction 74. The error (e) is amplified at block 75 by a known gain (K) before being integrated at block 76 with respect to time to yield a ramped signal 77, which is communicated to the power converter as the actual torque command signal (T).

Input 78 to the integrator 76 is representative of the rate of change of the actual torque command signal (T) received by the power converter, and hence is also representative of the power ramp rate of the generator. According to aspects of the present technique, power ramp rate of the generator is controlled by limiting the input the integrator 76 via a rate-limiter 80. The rate-limiter 80 is configured such that output 78 of the rate-limiter 80 is limited by a maximum value defined by an upper bound of the rate-limiter 80. That is, the output 78 of the rate-limiter 80 is equal to the input 82 to the rate limiter 78 until the input 82 exceeds the upper bound, in which case the output 78 of the rate-limiter is substantially constant and equal to the upper bound value. In one embodiment, the upper bound of the rate-limiter 80 is defined by a rate limiting signal (rr) based on a ramp rate command signal (Δrr) generated by the wind farm control system 48, explained in detail in the latter sections. The ramp rate command signal (Δrr) is based on desired long-term and short-term power ramp rates of the wind farm 12 set by transmission system operators. It is thus possible to control maximum power ramp rates of individual wind turbine generators by adjusting the ramp rate command signal (Δrr) by the wind farm control system 48. In the illustrated embodiment, by setting the upper-bound of the limiter 78 via the rate limiting signal (rr**), the rate of change of torque output of the generator may be controlled in a way such that rate of change of generator power output does not exceed ramp rate limits set by the wind farm control system 48. In certain embodiments, the rate-limiter 80 may also include a lower bound ($-rr_{max}$), indicative of a maximum specified negative power ramp rate of the generator.

The illustrated feedback control system is adapted to minimize the error (e) with time, such that the actual torque command (T**) approaches the generated torque command (T*). At steady state, the error (e) approaches zero, resulting in a substantially constant torque command signal (T**) received by the power converter. The rate at which the error (e) approaches zero is dependent on the value of the gain K. Hence, the gain K is chosen to have a sufficiently large value to provide a desirably fast closed-loop response to variations in the torque command signal. In certain embodiments, the above-described technique for turbine level control of power ramp rate may be achieved via limiting of a power command by the rate limiting signal. Torque and speed set points are then calculated based on power settings and applied to the power converter and the pitch control system respectively.

Figure 4:
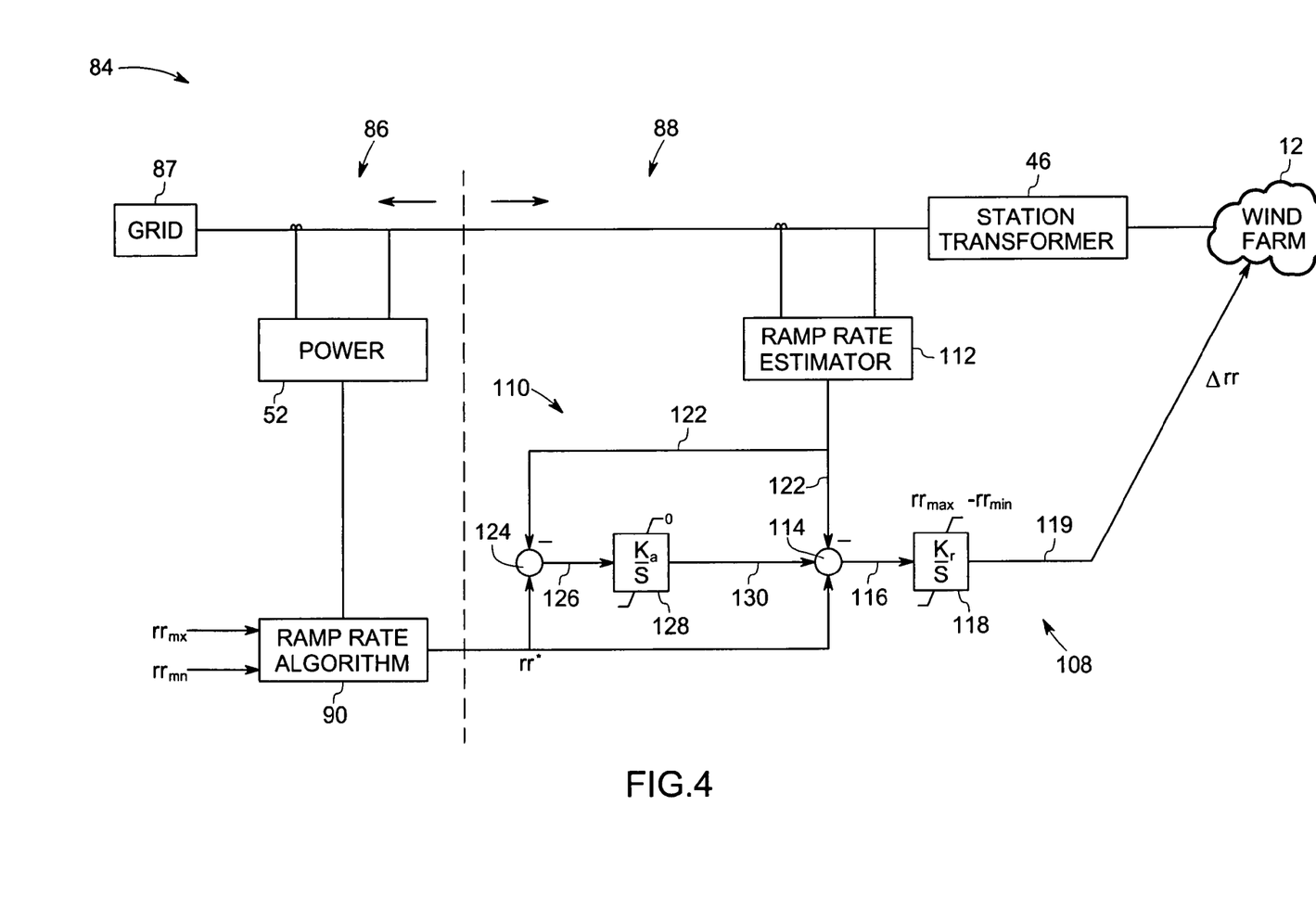
FIG. 4 is schematic illustration of a supervisory ramp rate control mechanism in accordance with the present technique.

The wind farm control system 48 is configured to control rate of change of collective power output of the wind turbine generators at a wind farm level via a supervisory ramp rate control mechanism 84 illustrated in FIG. 4. In one embodiment, functional blocks of the supervisory ramp rate control mechanism are implemented via the central controller 50. The supervisory ramp rate control mechanism 84 includes a slow-ramp control mechanism 86 and a fast-ramp control mechanism 88. The slow-ramp control mechanism 86 is operable to generate a ramp rate request signal (rr*) which is adapted to maximize energy production of the wind farm 12 while maintaining average ramp rate of the wind farm 12 within limits specified by transmission system operators. The fast-ramp control mechanism 88 operates by comparing measured wind farm ramp rate against the ramp rate request signal (rr*) and adjusting power ramp rates at turbine levels to maintain the requested level. The slow ramp control mechanism 86 and the fast ramp control mechanism 88 are discussed in greater detail below.

The slow-ramp control mechanism 86 comprises a ramp rate algorithm 90 configured to monitor wind farm power output sensed by power sensors 52, and compute a ramp rate request (rr*) based on a first specified average ramp rate for a first time window and a second specified average ramp rate for a second time window. In the illustrated embodiment, the first and second time windows are chosen to comprise durations of 1 minute and 10-15 minutes respectively. The first specified average ramp rate is typically greater than the second specified average ramp rate. Hence, the first and second specified average ramp rates are also referred to in this discussion as fast ramp rate ($rr_{mx}$) and slow ramp rate ($rr_{mn}$)

respectively. The fast ramp rate ($rr_{mx}$) and the slow ramp rate ($rr_{mn}$) are generally specified by the transmission system operators.

Figure 5:
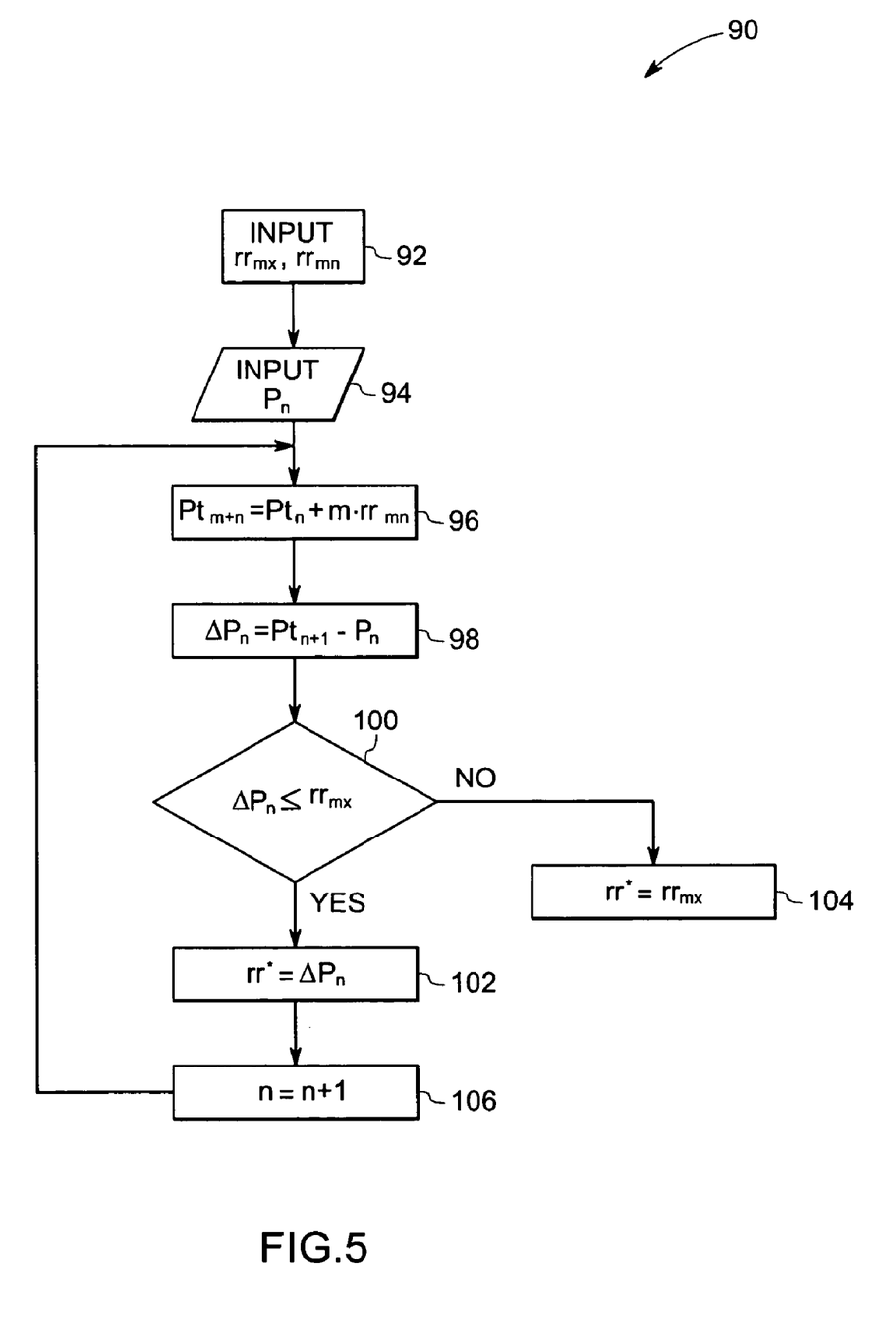
FIG. 5 is a flow chart illustrating an exemplary algorithm to compute ramp rate command based on a fast ramp rate and a slow ramp rate.

Referring momentarily to FIG. 5 an exemplary ramp rate algorithm 90 is illustrated in accordance with aspects of the present technique. The algorithm accepts the fast ramp rate ($rr_{mx}$) and the slow ramp rate ($rr_{mn}$) as inputs at step 92. At step 94, the algorithm 90 receives as input corresponding to an instantaneous measured power output ($P_n$) of the wind farm, where n is the fast sample interval (e.g., one minute). Next, at step 96, the algorithm 90 determines a projected wind farm power output ($Pt_{m+n}$) at the end of a sliding period, where m is the length of the second time window (typically 10-15 one-minute intervals). The projected wind farm power output ($Pt_{m+n}$) is determined based on the instantaneous measured power output of the wind farm ($P_n$) at the $n^{th}$ interval and the specified slow ramp rate ($rr_{mn}$). At step 98, a projected rate of change of wind farm power output ($\Delta P_n$) is determined based on a difference between the instantaneous measured power output ($P_n$) and the previously calculated projected wind farm power output ($Pt_{n+1}$) for the next sample interval (ie, for the sample interval n+1). If at step 100, the projected rate of change of wind farm power output ($\Delta P_n$) is less than or equal to the specified fast ramp rate ($rr_{mx}$), then the ramp rate request (rr*) is assigned to be equal in value to the projected rate of change of wind farm power output ($\Delta P_n$) at step 102. If the above is not true, the ramp rate request (rr*) is assigned to be equal in value to the specified fast ramp rate ($rr_{mx}$) at step 104. The above steps are then repeated for the subsequent sample interval (n+1). The ramp rate request (rr*) determined by the ramp rate algorithm 90 is thus limited by a maximum value equal to the specified fast ramp rate ($rr_{mx}$), and is configured to generate a target or projected wind farm power output based on the specified slow ramp rate ($rr_{mn}$).

Referring back to FIG. 4, the fast-ramp control mechanism 88 is operable to communicate the ramp rate request (rr*) thus established to individual wind turbine generators as a ramp rate command signal (Δrr). This is achieved via a feedback control loop 108 and a corrector loop 110. The feedback control loop 108 is configured to provide a closed-loop response for reducing errors between the ramp rate request (rr*) and the actual power ramp rate of the wind farm 12. Actual power ramp 122 rate of the wind farm 12 is established by a ramp rate estimation module 112. In one embodiment, ramp rate estimation module 112 may comprise an algorithm adapted to determine a rolling average of rate of change of sensed wind farm power output. At junction 114, a signal 116 is generated based on a difference between the ramp rate request (rr*) and the actual wind farm ramp rate 122 estimated at block 112. Closed-loop response is achieved via an integral controller 118, which amplifies the signal 116 by a known gain (Kr) and integrates the resulting signal with respect to time. The gain (Kr) is adjusted to provide an adequately fast closed-loop response to ramp rate disturbances in the wind farm 12.

The maximum and minimum instantaneous ramp rates set by the turbine manufacturer are identified in FIGS. 3 and 4 as $rr_{max}$ and $rr_{min}$, respectively. In general, $rr_{max} \geq rr_{mx} \geq rr_{mn} \geq rr_{min}$. In accordance with one aspect of the present technique, output signal 119 of the integral controller 118 is limited by an upper bound value equal to a difference between these maximum and minimum values, as illustrated in FIG. 4. This output signal 119 is then broadcast to the wind farm 12 as a ramp rate command signal (Δrr). In one embodiment, the ramp rate command signal (Δrr) is communicated by the central controller 50 to individual turbine controllers in the wind farm 12 via communication links 54, which may comprise wired or wireless remote communication links, as described above.

As shown in FIG. 3, the ramp rate command signal ($\Delta$rr) is summed with the minimum specified ramp rate ($rr_{min}$) at junction 120, to yield a ramp rate limiting signal ($rr^{}$) for individual turbine controllers. The ramp rate limiting signal ($rr^{}$) is thus designed to be greater than or equal to a minimum value defined by ($rr_{min}$). Hence, when the ramp rate command ($\Delta$rr) approaches zero, maximum power ramp rate attainable by the wind turbine generator is equal to the minimum instantaneous ramp rate ($rr_{min}$) of the wind farm 12. In accordance with aspects of the present technique, during normal operation when $\Delta$rr>0, certain wind turbine generators in the wind farm 12 may ramp their power output at a rate greater than the minimum specified rate ($rr_{min}$), while certain other wind turbine generators operate at relatively slower (or negative) ramp rates dictated by local wind conditions for these turbines, such that average ramp rate of the wind farm 12 does not exceed the fast or slow average ramp rates set by the transmission system operator. The above feature allows maximum capture of wind energy by the individual wind turbine generators while maintaining the ramp rates specified by the transmission system operator at the wind farm level. This is particularly advantageous in large wind farms, where wind conditions vary significantly among over individual wind turbine generators.

Referring back to FIG. 4, when the actual wind farm power ramp rate 122 exceeds the ramp rate request ($rr^*$), the output 116 obtained at the junction 114 becomes negative. The closed-loop control mechanism 108 accordingly reduces the ramp rate request ($rr^*$), such that the wind farm power output 122 approaches the ramp rate ($rr^*$). However, in such a case, the wind farm ramp rate averaged over the smaller time window of one minute tends to be greater than the fast ramp rate ($rr_{mx}$) prescribed by the transmission system operators. The corrector loop 110 is operable to adjust the ramp rate request ($rr^*$) to provide a correction for the average wind farm power ramp rate over a one minute time window. In the illustrated embodiment, at junction 124, a signal 126 is generated based on the difference between the ramp rate request ($rr^*$) and the actual wind farm rate 122. The signal 126 is amplified by a gain (Ka) and integrated via an integral controller 128. The integral controller 128 is configured to generate an output 130 only if the signal 126 comprises a negative value. This may be achieved by setting the upper bound value for the integral controller 128 to zero. Thus, when the actual wind farm power ramp rate 122 exceeds the ramp rate request ($rr^*$), the signal 130, which comprises a negative value, is summed with the difference between the ramp rate request ($rr^*$) and the actual wind farm power output 122 at the junction 114. This causes the input 116 to the feedback control mechanism 108 to have an additional negative component, which tends to further decrease the wind power output 122 below the ramp rate request ($rr^*$), such that when averaged over a one minute time duration, the average wind farm ramp rate follows the specified fast ramp rate over a 1 minute time window. The operation of the corrector loop 110 is further illustrated with reference to FIG. 6.

Figure 6:
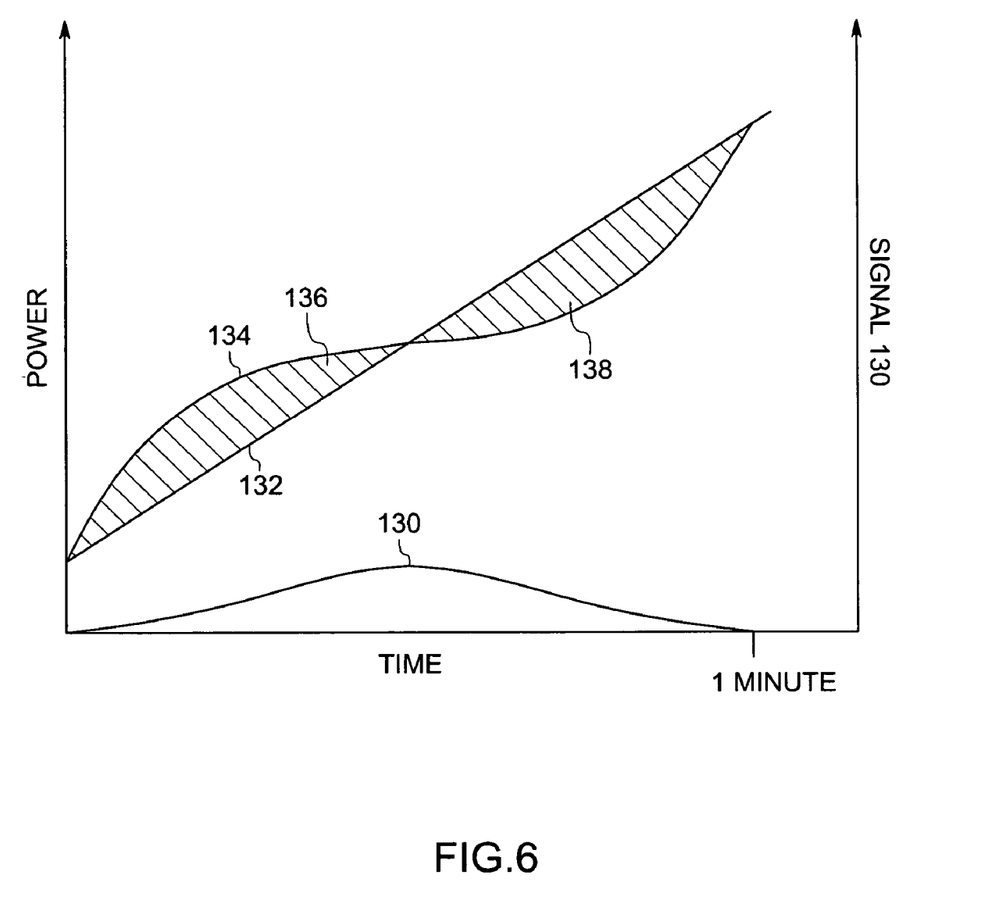
FIG. 6 is a graphical illustration showing the variation with time of ramp rate request and actual wind farm ramp rate with time according to aspects of the present technique.

FIG. 6 illustrates an exemplary variation in the ramp rate request and the actual wind farm ramp rate with time according to aspects of the present technique. The desired ramp rate (corresponding to $rr^*$) is generally represented by trace 132 and the corresponding variation in actual wind farm power output is represented generally by trace 134. As illustrated, when the actual wind farm power ramp rate increases above the ramp rate request (represented by a positive area 136), the corrector loop 110 adjusts the wind farm ramp rate via a correction signal 130, causing actual power output to fall below the ramp rate request (represented by a negative area 138), such that the arithmetic sum of areas 136 and 138 over a one minute time duration is zero. The corrector loop 110 is thus configured to regulate the wind farm power ramp rate to obey the fast ramp rate over the one-minute window.

As will be appreciated, the above described techniques provide a coordinated control of wind farm power ramp rates that manages aggregate behavior of the wind farm to respect short-term and long-term ramp rates specified by transmission system operators. The techniques described further provide for maximum capture of wind energy by the wind farm by allowing individual wind turbine generators to operate above or below the desired collective ramp rate for the wind farm.

As will be also appreciated, the above described techniques may take the form of computer or controller implemented processes and apparatuses for practicing those processes. Aspects of the present technique may also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The techniques described may further be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for regulating rate of change of collective power output of a plurality of wind turbine generators, comprising:
    monitoring rate of change of collective power output of the plurality of wind turbine generators; and
    limiting the rate of change of the collective power output of the plurality of wind turbine generators via generating of a power output rate limiting signal based on the monitored rate of change of collective power output of the wind turbine generators and a desired collective power ramp of the wind turbine generators and applying the power output rate limiting signal to the plurality of wind turbine generators, wherein generating the power output rate limiting signal comprises determining a ramp rate request based on a first desired collective power ramp rate over a first time duration and a second desired collective power ramp rate over a second time duration greater than the first time duration.

2. The method of claim 1, wherein the ramp rate request determined is configured to control collective power output of the wind turbine generators such that the collective rate of change of power output of the wind turbine generators does not exceed the first desired collective power ramp rate over the first duration and does not exceed the second desired collective power ramp rate over the second time duration.

3. The method of claim 1, wherein the first desired collective power ramp rate is greater than the second desired collective power ramp rate.

4. The method of claim 1, wherein applying the power output rate limiting signal comprises communicating the ramp rate request to the plurality of wind turbine generators via a closed loop integral feedback control system, wherein the ramp rate request is limited by a maximum ramp rate value and a minimum ramp rate value.

5. The method of claim 4, wherein applying the power output rate limiting signal further comprises adjusting the ramp rate request to provide a correction for average ramp rate response of the plurality of wind turbine generators over the first time duration.

6. The method of claim 1, further comprising limiting rate of change of an operating parameter of a wind turbine generator via the power output rate limiting signal.

7. The method of claim 6, wherein the operating parameter includes generator power, generator torque, or combinations thereof.

8. A method for regulating collective ramp rate of power output of a plurality of wind turbine generators, comprising:
monitoring rate of change of collective power output of the plurality of wind turbine generators;
generating a power output rate limiting signal based on monitored rate of change of collective power output of the wind turbine generators and a desired collective power ramp of the wind turbine generators;
applying the power output rate limiting signal to the plurality of wind turbine generators; and
operating at least one wind turbine generator such that rate of change of power output of the at least one wind turbine generator exceeds a desired collective power ramp rate of the plurality of wind turbine generators, wherein the desired collective power ramp rate comprises a first predetermined collective power ramp rate over a first time duration and a second predetermined collective power ramp rate over a second time duration greater than the first time duration.

9. The method of claim 8, further comprising limiting rate of change of an operating parameter of a wind turbine generator via the power output rate limiting signal.

10. The method of claim 9, wherein the operating parameter includes power, torque, or combinations thereof.

11. A method for remotely controlling collective rate of change of power output of a plurality of wind turbine generators, comprising:
monitoring rate of change of collective power output of the plurality of wind turbine generators;
generating a power output rate limiting signal based on monitored rate of change of collective power output of the wind turbine generators and a desired collective power ramp of the wind turbine generators; and
remotely communicating the power output rate limiting signal to the plurality of wind turbine generators to control rate of change of one or more operating parameters of the wind turbine generators;
wherein generating the power output rate limiting signal comprises determining a ramp rate request based on a first desired collective power ramp rate over a first time duration and a second desired collective power ramp rate over a second time duration greater than the first time duration.

12. The method of claim 11, wherein controlling rate of change of one or more parameters of the wind turbine generators comprises limiting the rate of change of the one or more parameters via the power output rate limiting signal.

13. The method of claim 11, wherein the one or more operating parameters of the wind turbine generators include generator power.

14. The method of claim 11, wherein the one or more operating parameters of the wind turbine generators include generator torque.

15. A wind farm, comprising:
a plurality of wind turbine generators operable to collectively supply electrical power to a utility system; and
a wind farm control system operable to generate a power output rate limiting signal based on monitored collective power ramp rate of the wind turbine generators and a desired ramp rate of the wind farm, and to transmit the power output rate limiting signal to the plurality of wind turbine generators to control rate of change of one or more operating parameters of individual wind turbine generators, wherein the power output rate limiting signal is generated based on a first desired collective power ramp rate over a first time duration and a second desired collective power ramp rate over a second time duration greater than the first time duration.

16. A wind farm control system, comprising:
a central controller operable to monitor rate of change of collective power output of a plurality of wind turbine generators and limit the rate of change of the collective power output of the plurality of wind turbine generators by generating a power output rate limiting signal based on the monitored rate of change of collective power output of the wind turbine generators and a desired collective power ramp of the wind turbine generators and communicating the power output rate limiting signal to the plurality of wind turbine generators, wherein the central controller is operable to determine a ramp rate request based on a first desired collective power ramp rate over a first time duration and a second desired collective power ramp rate over a second time duration greater than the first time duration.

17. The wind farm control system of claim 16, wherein the central controller is further operable to communicate the ramp rate request to the plurality of wind turbine generators via a closed loop integral feedback control system, wherein the ramp rate request is limited by a maximum ramp rate value and a minimum ramp rate value.

* * * * *